United States Patent [19]

Akasaka et al.

[11] 4,057,333
[45] Nov. 8, 1977

[54] EXPOSURE TIME CONTROL DEVICE IN A CINECAMERA

[75] Inventors: Shigeo Akasaka, Kodaira; Hiroaki Tanaka, Tokyo, both of Japan

[73] Assignee: Nippon Kogaku K.K., Tokyo, Japan

[21] Appl. No.: 608,007

[22] Filed: Aug. 26, 1975

[30] Foreign Application Priority Data

Aug. 30, 1974 Japan .................................. 49-98936

[51] Int. Cl.² ............................................. G03B 7/08
[52] U.S. Cl. ...................................... 352/141; 352/121
[58] Field of Search .................................. 352/121, 141

[56] References Cited

U.S. PATENT DOCUMENTS

| 3,705,764 | 12/1972 | Reinsch | 352/141 |
| 3,854,805 | 12/1974 | Tobioka | 352/121 |
| 3,898,000 | 8/1975 | Kobayashi | 352/141 |

Primary Examiner—Monroe H. Hayes
Attorney, Agent, or Firm—Fitzpatrick, Cella, Harper & Scinto

[57] ABSTRACT

An exposure time control device in a cinecamera comprises a rotatable shutter, an electric motor for driving the shutter, a power source for the motor, and changing means operatively associated with the rotatable shutter to change the number of revolutions of the motor within a period during which an aperture is opened and closed by the rotatable shutter.

9 Claims, 14 Drawing Figures

EXPOSURE TIME CONTROL DEVICE IN A CINECAMERA

BACKGROUND OF THE INVENTION

1. Field of the Invention

This invention relates to a photographic exposure time control device, and more particularly, to an exposure time control device for use in a cinecamera.

2. Description of the Prior Art

Constructions are presently known according to which, in order to vary the exposure time in a cinecamera, one must adjust either the angle of opening of the shutter blade or the time required for the opening of the shutter blade to traverse the aperture (the opening for picture-taking), that is, the rotational speed at which the shutter blade traverses the aperture. A typical type of the former design is that in which the angle of opening is varied directly by two blades, and an example of the latter design is that in which the rotational speed of the shutter itself is varied during one-frame photography (one complete rotation) with the number of revolutions of the shutter blade driving motor maintained constant.

However, both of these known designs require very complicated constructions.

SUMMARY OF THE INVENTION

We have conceived and contribute by the present invention means whereby we are able to eliminate the above-noted disadvantage and to provide a device which enables the adjustment of the exposure time by means of a simple construction.

According to the present invention, we provide an exposure time control device in a cinecamera which comprises rotatable shutter means, electric motor means for driving the rotatable shutter means, power source means for supplying a current to the electric motor means, and changing means operatively associated with the rotatable shutter means to change the number of revolutions of the electric motor means within a period during which an aperture is opened and closed by the rotatable shutter means.

There has thus been outlined, rather broadly, the more important features of the invention in order that the detailed description thereof that follows may be better understood, and in order that the present contributions to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

A first embodiment of the present invention, as applied to a rotational speed control circuit utilizing a generator, will now be described by reference to the drawings.

Figure 1:
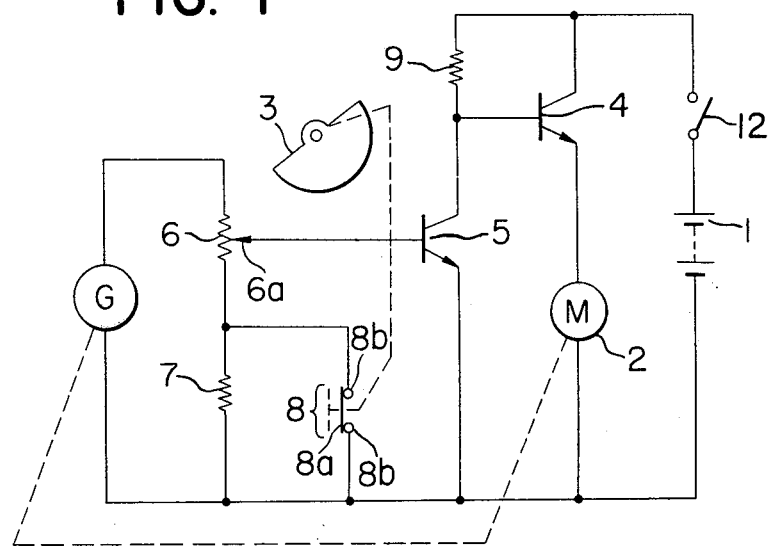
FIG. 1 is a diagram of the speed control circuit according to a first embodiment of the present invention.

Referring to FIG. 1, a power supply battery 1 supplies a current to a motor 2 for driving a shutter blade 3 through a motor controlling transistor 4. An amplifier transistor 5 detects and amplifies the output voltage of a generator G. A variable resistor 6 for changing the film transport speed is connected to the base of the amplifier transistor 5, and a biasing resistor 7 is series-connected to the variable resistor 6. A phase switch 8 may be opened and closed by a conductor plate 8a and a contact 8b operatively associated with the shutter blade 3, and is parallel-connected to the biasing resistor 7. The time at which the phase switch 8 is opened and closed may be selected extraneously, as desired. The generator G generates a voltage proportional to the number of revolutions of the motor and is parallel-connected to the variable resistor 6 and the biasing resistor 7. A resistor 9 is provided for biasing the transistor 4.

Operation of the first embodiment will now be described:

1. In closed position of the phase switch:

Upon occurrence of shutter release, the circuit is rendered operative by a main switch 12 to energize the motor 2 for revolution, which in turn drives the shutter blade to open an aperture 10 thereby to permit film exposure to take place.

As the number of revolutions of the motor increases, the output voltage of the generator G increases so that the base voltage of the amplifier transistor 5 is increased, the collector current of the transistor 5 is increased and the voltage drop of the resistor 9 is increased. Accordingly, the base potential of the transistor 4 is decreased and the emitter current thereof, that is, the supply current to the motor 2 is decreased to reduce the terminal voltage of the motor 2, thus suppressing the increase in the number of revolutions of the motor.

Conversely, as the number of revolutions of the motor decreases, an action reverse to the action described above takes place to suppress the decrease in the number of revolutions, whereby the motor 2 is maintained at a constant number of revolutions as determined by the base potential of the transistor 5. The rotational speed of the shutter blade at this time is defined as N1 r.p.m.

2. In open position of the phase switch:

In this position, the biasing resistor 7 is connected to the base of the amplifier transistor 5. Therefore, when the circuit is rendered operative, the base potential of the amplifier transistor 5 is maintained higher than in the position (1). Accordingly, the number of revolutions of the motor 2 is maintained at a predetermined lever lower than that in the position (1). The rotational speed of the shutter blade at this time is defined as N2 r.p.m.

The effective difference in the angle of opening of the shutter depending on the time at which the phase switch is opened and closed, will now be described by reference to FIGS. 2 to 5.

Figure 2A:
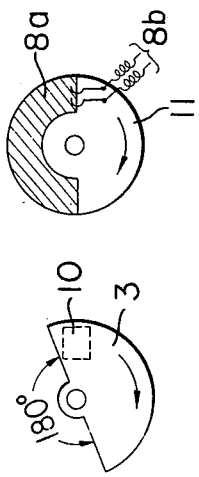
FIGS. 2(a), 3(a), 4(a) and 5(a) illustrate the phase conditions of a phase switch.
Figure 2B:
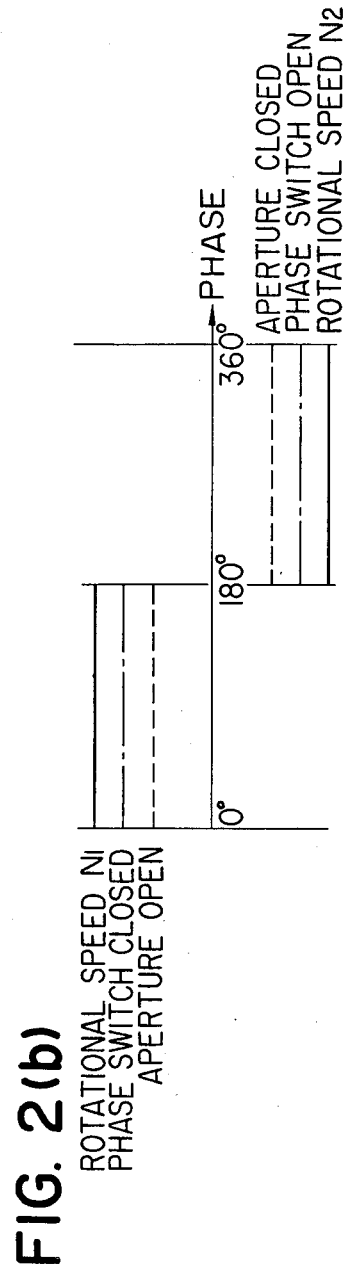
FIGS. 2(b), 3(b), 4(b) and 5(b) graphically illustrate the conditions of the rotational speed, the phase switch and the aperture depending on phase.
Figure 2C:
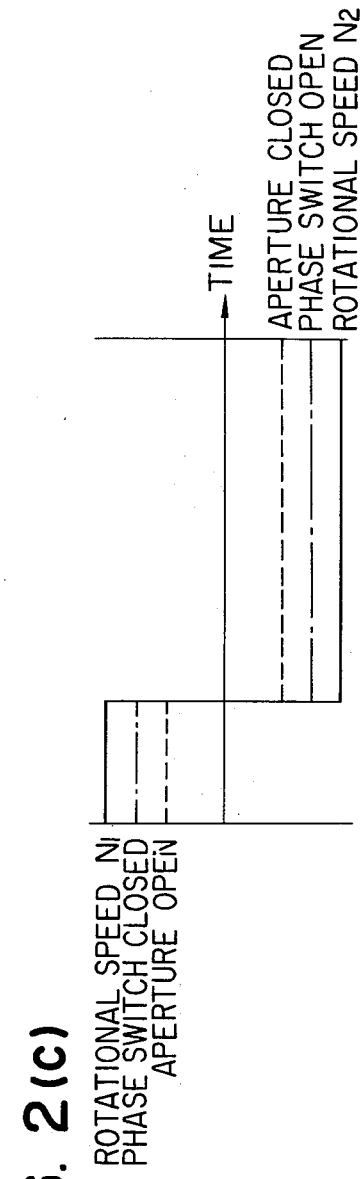
FIGS. 2(c), 3(c), 4(c) and 5(c) graphically illustrate the conditions of the rotational speed, the phase switch and the aperture depending on time.
Figure 3A:
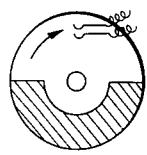
Figure 3B:
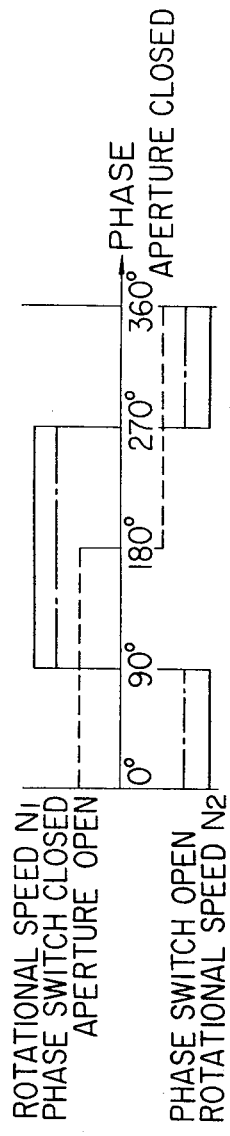
Figure 3C:
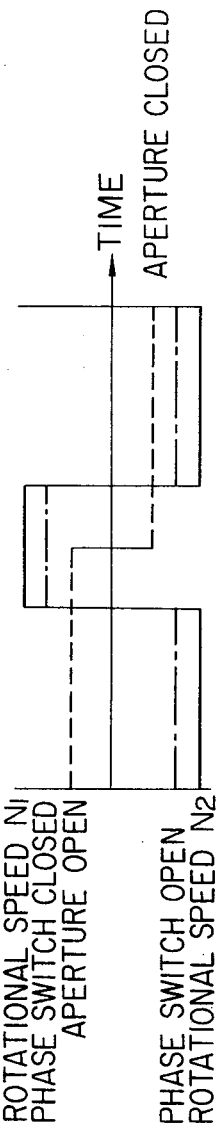
Figure 4A:
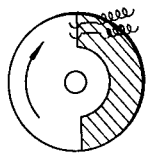
Figure 4B:
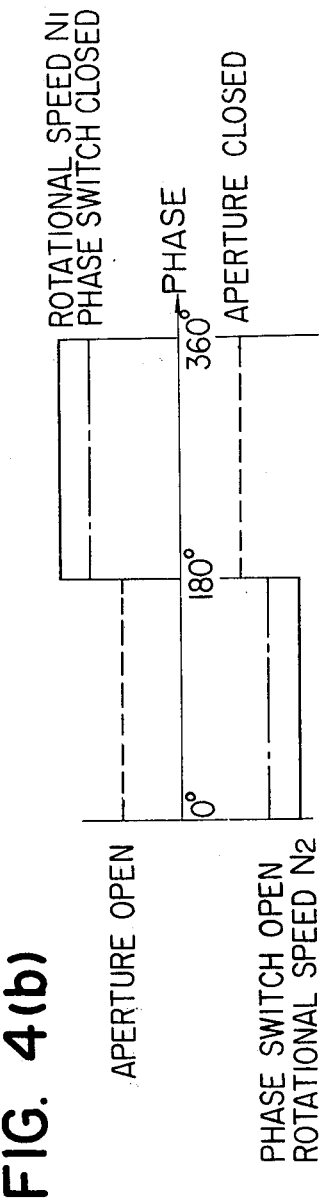
Figure 4C:
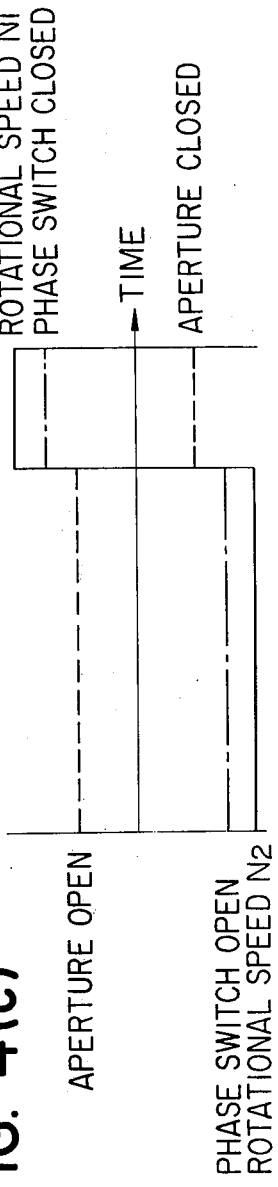
Figure 5A:
Figure 5B:
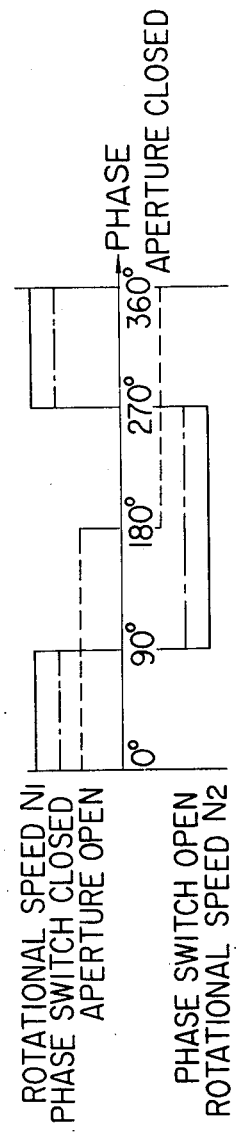
Figure 5C:
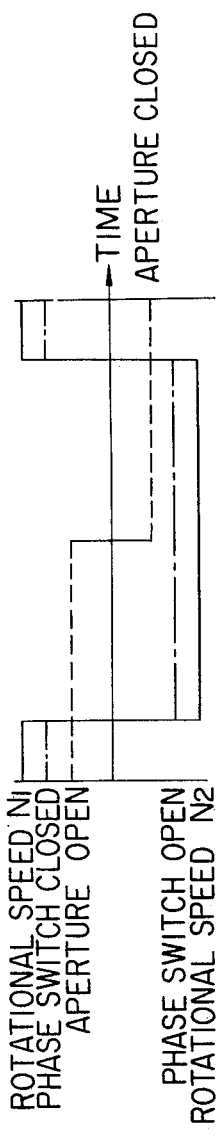

FIGS. 2(a) to 5(a) show the phase conditions of the shutter blade 3 and the phase switch 8 prior to film exposure, and the initial position of the shutter blade 3 is shown only in FIG. 2(a), although this holds true with respect to FIGS. 3(a), 4(a) and 5(a). The angle of opening of the shutter blade 3 is 180°. A phase plate 11, mounted coaxially and cooperable with the shutter blade 3, has secured thereto, as one terminal, the connector plate 8a having an angle of contact substantially equal to the angle of opening of the shutter blade 3, and the other terminal contact 8b of the phase switch 8 is secured to the camera body at the position indicated in FIGS. 2(a) to 5(a).

The phase plate 11 is normally associated with the shutter blade by unshown means but is also designed for rotation independently of the shutter blade 3 so as to permit the time for opening and closing of the phase switch 8 to be selcted extraneously, as desired. The arrows indicate the directions of rotation of the phase plate 11 and the shutter blade 3, respectively.

FIGS. 2(b) to 5(b) and FIGS. 2(c) to 5(c) are graphs in which the different numbers of revolutions N1 and N2 (solid lines) of the motor, the opening-closing (broken lines) of the phase switch and the opening-closing (broken lines) of the aperture (indicated by 10 in FIG. 2(a)) are shown with phase (360° per rotation) and time (required per rotation) as abscissa, respectively. It is to be noted that a predetermined film transport speed is maintained since the two different numbers of revolutions of the motor during one complete revolution thereof are set to such magnitudes that the time required for one complete rotation of the shutter blade, namely, one period of opening-closing of the aperture, is always constant.

Now, when the main switch 12 is closed in the condition shown in FIG. 2(a), the motor revolves at the speed of N1 r.p.m. because the phase switch 8 is in closed position, and the aperture 10 is opened to permit film exposure to take place. When the shutter blade 3 has been rotated through 180°, the conductor plate 8a on the phase plate 11 is disengaged from the contact 8b so that the biasing resistor 7 is connected to the variable resistor 6 to change the number of revolutions of the motor to N2 r.p.m. and at the same time the aperture 10 is closed to complete the film exposure.

Thereafter, the shutter blade 3 continues to rotate at the lower speed, N2 r.p.m., to restore the condition shown in FIG. 2(a). Upon closing of the aperture 10, the film is transported by one frame.

Therefore, in one-frame photography (one complete rotation), the time during which the film exposure actually occurs is much shorter than one-half of the time required for one complete rotation, as indicated by aperture "OPEN" in FIG. 2(c), in spite of the fact that the angle of opening of the shutter blade 3 is 180°.

By replacing time with 360° phase for the abscissa in FIGS. 2(c) to 5(c), the aperture "OPEN" in these graphs indicates the effective angle of opening of the shutter. Thus, as viewed in FIG. 2(c), the effective angle of opening of the shutter is about 90°.

FIG. 3 refers to a case in which the phase plate 11 is rotated counterclockwise relative to the shutter blade 3 (see FIG. 3(a)), and in this case, the aperture is opened at the rotational speed N2 r.p.m. for the first 90° and at the rotational speed N1 r.p.m. for the last 90°. As a result, the effective angle of opening of the shutter is substantially equal to the actual angle of opening of the shutter.

FIG. 4 refers to a case in which, from the position of FIG. 3, the phase plate 11 is rotated counterclockwise for an additional 90° relative to the shutter blade 3 and in such case, the rotational speed is N2 r.p.m. as long as the aperture is open, and the effective angle of opening of the shutter is maximum (about 270° as viewed in FIG. 4(c)).

FIG. 5 refers to a case in which, from the position of FIG. 4, the phase plate 11 is further rotated counterclockwise for still an additional 90° relative to the shutter blade 3. In this case, the effective angle of opening of the shutter is the same as that in the case of FIG. 3.

Thus, if the phase plate 11 is designed to be operable continuously variably relative to the shutter blade 3, any desired effective angle of opening of the shutter may be selected within a predetermined range (in the present embodiment of FIGS. 2 to 5, the range of from 90° to 270°).

Now, if the frame feed speed is changed, for example, from 18-frame to 24-frame by operating an unshown member, then the voltage dividing point 6a of the film transport speed changing variable resistor 6 in FIG. 1 will slide downwardly to decrease the biasing resistance of the amplifier transistor 5, so that the motor 2 will be maintained at a higher number of revolutions and generally, a frame feed speed of say 24 frames per second will be maintained.

While, in the present embodiment, the conductor plate 8a is secured to the phase plate 11 which is extraneously operable for rotation, it is also readily possible to secure the phase plate 11 to the shutter blade 3 and to make only the conductor plate 8a extraneously operable for sliding movement.

Figure 6:
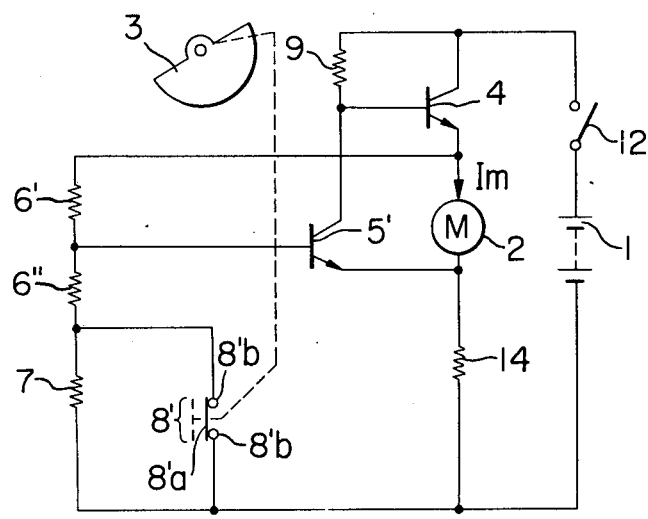
FIG. 6 is a diagram of the speed control circuit according to a second embodiment of the present invention.

A second embodiment of the present invention as applied to a speed control circuit utilizing the counter electromotive force of the motor itself will now be described by reference to FIG. 6. In this embodiment, reference characters common to the first embodiment designate functionally similar elements. Reference character 5' designates an amplifier transistor for detecting and amplifying the emitter and base potentials, and resistors 6' and 6" replace the frame feed speed changing variable resistor (designated at 6 in FIG. 1) in the first embodiment.

A resistor 14 is provided for biasing the emitter of the transistor 5'. The motor 2, the resistor 6", the biasing resistor 7 and the resistor 14 together form a bridge circuit.

In this embodiment, as the number of revolutions of the motor 2 increases, the counter electromotive force of the motor 2 itself is increased to decrease the current Im flowing through the motor 2, so that the voltage drop due to the resistor 14 is decreased to reduce the emitter potential of the transistor 5'. Thereafter, in the same manner as described with respect to the first embodiment, an increase in the number of revolutions of the motor 2 is suppressed and if the number of revolutions tends to decrease, such decrease is suppressed by an action reverse to the above-described action, whereby the motor 2 is always maintained at a predetermined number of revolutions.

When the phase switch 8' is open, the biasing resistor 7 is biased by the base of the transistor 5' and thus, the base potential of the transistor 5' becomes higher than that when the phase switch 8' is in closed position. Accordingly, the number of revolutions of the motor 2 is maintained at a predetermined level lower than that when the phase switch 8' is in closed position.

The difference in the effective angle of opening of the shutter depending on the time of opening-closing of the phase switch 8' is similar to that in the first embodiment.

In both of the first and second embodiments, the phase plate 11 supporting one terminal 8a, 8a' of the phase switch 8, 8' and the shutter blade 3 are mounted on a common shaft, whereas thses two plates need not always be mounted on a common shaft but the phase plate need only be associated with rotation of the shutter blade.

Further, the present invention does not restrict the rotational speed during one-frame photography to the two stages as in the illustrated embodiments, but is intended to cover adjustment of the exposure time by combination of a plurality of rotational speeds which may result from provision of a plurality of phase switches.

According to the present invention, as has hitherto been described, adjustment of the exposure time by the rotating shutter has become feasible by a very simple construction in which the phase switch for controlling the revolutions of the motor is operatively associated with the shutter blade.

We believe that the construction and operation of our exposure time control device will now be understood and that the advantages thereof will be fully appreciated by those persons skilled in the art.

We claim:
1. An exposure time control device for a cinecamera comprising:
 a. rotatable shutter means;
 b. means including an electric motor for driving said rotatable shutter means;
 c. changing means operatively associated with said rotatable shutter means to change the number of revolutions of said electric motor within a period during which an aperture is opened and closed by said rotatable shutter means; and
 d. circuit means for supplying an electrical signal to said motor for energization thereof, and wherein said changing means includes means to change the magnitude of said electrical signal within a period during which an aperture is opened and closed by said rotatable shutter means thereby to change the number of revolutions of said motor according to said magnitude.

2. An exposure time control device as defined in claim 1, wherein said changing means includes an externally accessible member for determining the exposure time, within said period, thereby permitting variations in the exposure time.

3. An exposure time control device as defined in claim 1, wherein said changing means changes the number of revolutions of said motor so that the period of opening-closing of the aperture is always constant, thereby maintaining a predetermined film transport speed.

4. An exposure time control device for a cinecamera comprising:
 a. rotatable shutter means;
 b. means including an electric motor for driving said rotatable shutter means;
 c. changing means operatively associated with said rotatable shutter means to change the number of revolutions of said electric motor within a period during which an aperture is opened and closed by said rotatable shutter means; and
 d. power source means for supplying a current to said motor, and wherein said changing means for changing the number of revolutions of said motor includes means for controlling the motor current which is supplied from said power source means to said motor, and change-over switch means operatively associated with said rotatable shutter means to operate said current control means in at least two-state conditions.

5. An exposure time control device as defined in claim 4, wherein said current control means include transistor means for controlling a current flowing to said electric motor means and bias means for applying a bias voltage to said transistor means, and said switch means includes phase switch means operatively associated with said rotatable shutter means to change over the bias value of said bias means to at least two stages.

6. An exposure time control device as defined in claim 5, wherein said phase switch means includes a rotatable member operatively associated with said rotatable shutter means, said switch being closed and opened by rotation of said rotatable member to change over the bias value of said bias means.

7. An exposure time control device as defined in claim 5, further comprising:
 determining means extraneously operable and for determining the film transport speed, said determining means being effective to vary the bias value of said bias means independently of said phase switch; said phase switch further varying the bias value determined by said determining means in response to closure and opening of said phase switch.

8. An exposure time control device as defined in claim 7, further comprising:
 detector means for detecting a variation in the number of revolutions of said electric motor, said detector means being effective to vary the bias value of said bias means in accordance with the detection value thereof to stabilize the revolution of said electric motor means to the number of revolutions determined by said determining means.

9. An exposure time control device for a cinecamera comprising:
 a. rotatable shutter means;
 b. means including an electric motor for drivng said rotatable shutter means;
 c. changing means operatively associated with said rotatable shutter means to change the number of revolutions of said electric motor within a period during which an aperture is opened and closed by said rotatable shutter means; and
 d. a negative feedback circuit for maintaining a stable number of revolutions of said electric motor, said negative feedback circuit comprising:
 means for detecting a variation in the number of revolutions of said electric motor;
 control means for controlling the current flowing to said electric motor; and
 actuation means for actuating said control means so that the motor current may suppress the variation in the number of revolutions of said motor in accordance with the output of said detector means;
 said changing means for changing the number of revolutions being operatively associated with said rotatable shutter means to vary the output of said actuator means independently of said detector means.

* * * * *